Patented Dec. 20, 1938

2,141,043

UNITED STATES PATENT OFFICE 2,141,043

MOLDING POWDER

Cornelis Maters, The Hague, Netherlands, assignor to Hercules Powder Company, Wilmington, Del., a corporation of Delaware No Drawing. Application February 19, 1938,
Serial No. 191,457

8 Claims. (Cl. 106—22)

This invention relates to a molding powder and more particularly it relates to a molding powder containing as an essential ingredient a condensation product formed from extracted pine wood pitch and an aldehyde.

Extracted pine wood pitch, which is complex resinous material whose exact composition is unknown, comprises the residue left after the separation of rosin, turpentine and other more valuable constituents of pine wood. It has heretofore been considered substantially commercially valueless and has accordingly ordinarily been discarded.

The pine wood pitch utilized in the production of condensation products used in the molding powders in accordance with this invention, as has been indicated, is obtained in connection with the production of wood rosin from pine wood. The pine wood pitch will comprise a residue low in abietic acid remaining after the separation of refined rosin high in abietic acid from the resinous material obtained by extraction of pine wood with a solvent. It is characterized by substantial insolubility in cold petroleum hydrocarbons, but will differ somewhat in its specific characteristics, such as acid number, melting point, exact petroleum ether solubility and content of naphtha and toluol soluble matter, depending upon the method for the recovery of rosin from pine wood used in its production.

As is well known, rosin may be extracted from pine wood by the use of a suitable solvent, such as hot gasoline, benzol, etc., after steaming of the wood with live steam to remove volatile oils, such as turpentine and pine oil. Again, volatile oils, as turpentine, and pine oil, may be extracted with the rosin without first steaming for their removal.

Following extraction the extract will be distilled for the removal of solvent where the wood was subjected to steaming before extraction and for the removal of solvent and volatile oils, as turpentine and pine oil, where the wood was extracted directly without steaming. As the result of distillation a resinous material containing abietic acid and admixed impurities is obtained. This resinous material may be treated in any one of a number of ways, all known to the art, for the removal of refined rosin high in abietic acid. The residue remaining after the removal of refined rosin and comprising a dark colored, hard, resinous mass low in abietic acid constitutes pine wood pitch.

The exact properties of the pine wood pitch obtained as indicated above will depend upon the method used for original extraction from the wood. When the wood is steamed before solvent extraction, a pine wood pitch is obtained having somewhat different properties from that obtained when the wood is extracted without steaming. Likewise the properties of pine wood pitch are somewhat different when obtained by different methods of purification of rosin. A comparison of the properties of three pine wood pitches is given in the following table, in which Pitch A is that obtained by extraction of wood with hot petroleum solvents subsequent to the removal of the volatile oils by steam distillation, refining with furfural, evaporation of the furfural and then extraction with petroleum solvent to leave Pitch A as a residue. Pitch B is that obtained by a benzol extraction of unsteamed wood, evaporation of the benzol solution of the residue in hot low boiling petroleum solvent, precipitation of the Pitch B by washing with cold water, and then removal of this precipitate by filtration. Pitch C is obtained by the evaporation of the furfural layer, after refining of the gasoline solution of the crude resin obtained by the benzol extraction of pine wood.

|  | Pitch A | Pitch B | Pitch C |
|---|---|---|---|
| Melting point (Hercules drop method) | 91° C. | 115° C. | 102° C. |
| Acid number | 100 | 105 | 116 |
| Unsaponifiable matter | | 5% | 8% |
| V. M. & P. naphtha insoluble | 89.5% | 96% | 83% |
| Toluol soluble | | 40% | 98% |
| Petroleum ether insoluble | 92.0% | 99% | 95% |
| Saponification number | | 169 | 140 |
| Ash | | .036% | .022% |

The extracted pine wood pitch will be reacted with an aldehyde, as, for example, formaldehyde, paraformaldehyde, acetaldehyde, furfural, etc., to produce the condensation product which is the subject matter of this invention. Since extracted pine wood pitch and an aldehyde, as, for example, formaldehyde, combine readily in substantially all proportions, they may be reacted together in any proportion.

When sufficient quantities of the aldehyde are employed it will be found that the resultant condensation product is infusible and substantially insoluble. It is preferable, however, to use such quantities of the aldehyde, as formaldehyde, that the condensation product will not reach the infusible stage during its production, but will only become infusible upon continued heating at higher temperatures in admixture with, for example, hexamethylene tetramine, as in molding. Since the proportions of aldehyde and pine wood pitch to be used in the production of this still fusible condensation product depend upon the particular aldehyde employed, upon the particular type of pine wood pitch, etc., and to some extent upon the conditions which obtain during the reaction, it is not possible to state them exactly. However, they will usually vary from about 3% to about 10% of aldehyde by weight per unit weight of pine wood pitch, for an aldehyde such as formaldehyde.

The extracted pine wood pitch and the aldehyde may be combined in various ways. Where the aldehyde is a liquid or a solid it may be added directly to the pine wood pitch, which may be either in solution or molten. Formaldehyde may be added to molten or dissolved pine wood pitch in the form of its solid polymer, paraformaldehyde, or may be added to a solution of pine wood pitch as an aqueous solution. The pine wood pitch, when treated in solution, may be dissolved in an organic solvent therefor, as, for example, ethyl acetate, alcohol, acetone, etc. Where the pine wood pitch is to be treated with an aqueous formaldehyde solution, it will preferably be dissolved in a water-miscible organic solvent, as, for example, ethyl acetate, acetone, etc.

The extracted pine wood pitch may also be neutralized with an alkali metal hydroxide or carbonate and an aqueous solution of the alkali metal salt treated with an aqueous solution of formaldehyde. The free condensation product may then be recovered by treatment of the mixture with an acid, as hydrochloric acid, sulfuric acid, etc.

The reaction between the aldehyde and the pine wood pitch proceeds readily, and takes place even at room temperatures. It will, however, be desirable to carry out the reaction at an elevated temperature in order to obtain a satisfactorily rapid rate of reaction. Where solvents are present the reaction will usually be carried out at the boiling point of the solvent, although in the case of low boiling solvents it may be desirable to proceed under superatmospheric pressure. In general, a temperature of from about 20° C. to about 200° C. will be found suitable for the reaction, but it will be understood that this range by no means indicates the limits of operability.

In some cases it will be found desirable to employ a catalyst in small amount to accelerate the reaction, but in general the use of a catalyst will not be found necessary.

The following examples are illustrative of practical procedure for the production of the condensation product used in the molding powders in accordance with this invention.

Example I

Five grams of paraformaldehyde were gradually added to 100 g. of extracted pine wood pitch in a molten condition (temp. 200° C.). The paraformaldehyde was stirred into the molten mass as added until thoroughly incorporated in the mass. The condensation product had a melting point (drop method) of 164° C. compared to a melting point of 116° C. for the pine wood pitch. The addition of 10 g. of paraformalydehyde in place of 5 g. as above gave a condensation product having a melting point of 187° C.

Example II

One hundred parts of extracted pine wood pitch, of the type of pitch B described above, were dissolved in 100 parts of ethyl acetate. Twenty-five parts of a 40% aqueous solution of formaldehyde were then added to the ethyl acetate solution, and the resultant mixture heated under a reflux condenser at the boiling point of the solvent for about four hours. Water, ethyl acetate and unreacted formaldehyde were then removed from the mixture by distillation (which may be in vacuo) and the condensation product recovered as the residue. The condensation product was on the verge of infusibility. It was soluble in acetone and ester solvents, partially soluble in alcohol and ethylene dichloride, and insoluble in petroleum hydrocarbons, coal tar hydrocarbons and turpentine.

Example III

One hundred parts of extracted pine wood pitch having an acid number of 132, 10 parts sodium hydroxide and 200 parts of water were heated and stirred until complete solution took place. Twenty-five parts of a 40% aqueous solution of formaldehyde were then added in several portions with stirring. The mixture thickened very considerably. Dilute hydrochloric acid was then added to precipitate the free condensation product, which after being washed thoroughly with water was heated to remove the last traces of water.

The condensation product will, in its preferred form, be just on the verge of infusibility. It will then be characterized by being soluble in acetone and ester solvents, partially soluble in alcohol and ethylene dichloride, and insoluble in petroleum hydrocarbons, coal tar hydrocarbons and turpentine.

This condensation product may be pulverized and mixed with a small quantity of hexamethylene-tetramine to form a molding powder in accordance with this invention. This molding powder may be substituted in whole or in part for phenolaldehyde molding powders and may accordingly be used in conjunction with the usual fillers, etc. in the production of molded articles, since it will cure at molding temperatures to an infusible product.

Thus, for example, an extracted pine wood pitch-formaldehyde condensation product preferably having a softening point (drop method) of somewhat above usual molding temperatures, (about 150° C.) may be finely ground and mixed with a filler, as, for example, wood flour and a phenol-aldehyde type molding resin (containing some hexamethylene-tetramine). If desired, additional hexamethylene-tetramine may be added. The mixture will then be fused together on rubber rolls or other masticating machinery, the fused mass ground to coarse granules and then molded under heat and pressure at a curing temperature of about 150° C. to 165° C.

The extracted pine wood pitch formaldehyde condensation product may also be dissolved in a fused phenolic resin and the resultant mass ground and mixed with hexamethylene-tetramine and a filler to make a molding powder.

The softening or fusing point of the extracted pine wood pitch-aldehyde product for use in molding should not be substantially below the curing temperature or the curing period will be unduly prolonged; it should not, however, exceed 200° C., or the flow of the molding compound will be impaired.

As fillers, asbestos, chopped cloth or other well known materials may be used. For the elimination of sticking 1% of calcium stearate may be added.

If used in conjunction with laminated molding resins, the extracted pine wood pitch-formaldehyde product may be dissolved in phenolic laminating varnishes with alcohol solvent; but for the higher melting varieties acetone solvent will be necessary. The coating of cloth or paper and the molding is carried out under regular phenolic practice.

Another method of using extracted pine wood pitch-formaldehyde product consists in impregnating a web of cloth or paper with the product in solution or, in the case of low melting products, in a fused state; and then bonding the resulting sheets under heat and pressure.

The following examples illustrate practical molding procedure using extracted pine wood pitch-aldehyde condensation products:

*Example IV*

An extracted pine wood pitch-formaldehyde condensation product having a flow point of 138° C. by the drop method was ball-milled dry, as follows: 1 part condensation product; 2 parts two-stage phenolic molding resin; 3 parts wood flour. This mixture was sheeted on rolls, ground, and molded at 150° C. It was somewhat slower in cure than similar straight phenolic molding resins.

*Example V*

An extracted pine wood pitch-formaldehyde condensation product which would not soften at 150° C. but softened at 200° C. was compounded as follows: 9 parts condensation product; 1 part hexamethylene-tetramine; 20 parts phenolic molding resin; 30 parts wood flour. The resulting compound prepared and molded as in Example IV cured at about the same speed as phenolic molding compound.

*Example VI*

An extracted pine wood pitch-formaldehyde condensation product with a fusing point of approximately 180° C. was dissolved in twice its weight of fused phenol-aldehyde resin. The mixed resin was then ground with 10% of its total weight of hexamethylene-tetramine and the resulting resin used in combination with various fillers as a hot molding compound.

While in these examples the extracted pine wood pitch-aldehyde condensation product was used in conjunction with phenolic molding resins, it will be understood that it may be used with other types of resins, as, for example, shellac, or without the addition of any other resin at all.

It will be understood that the details and examples hereinbefore set forth are illustrative only, and are not in limitation of the invention herein broadly described and claimed.

This application is a continuation-in-part of my application, Serial No. 30,931, filed July 11, 1935.

What I claim and desire to protect by Letters Patent is:

1. A molding powder comprising hexamethylene-tetramine and a fusible condensation product of an aldehyde with a pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

2. A molding powder comprising hexamethylene-tetramine, a filler and a fusible condensation product of an aldehyde with a pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

3. A molding powder comprising a phenol-aldehyde molding resin, a filler and a fusible condensation product formed by the reaction of an aldehyde with a pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

4. A molding powder comprising hexamethylene-tetramine and a fusible condensation product of a formaldehyde with a pine wood pitch the said pitch being characterized by substantial insolubility in petroleum hydrocarbons and comprising a residue low in abietic acid remaining after the separation of refined rosin high in abietic acid from the resinous material obtained by extraction of pine wood with a solvent.

5. A molding powder comprising hexamethylene-tetramine, a filler and a fusible condensation product of a formaldehyde with a pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

6. A molding powder comprising a phenol-formaldehyde molding resin, a filler and a fusible condensation product formed by the reaction of a formaldehyde with a pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

7. A molding powder comprising hexamethylene-tetramine, a wood flour and a fusible condensation product of a formaldehyde with a pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

8. A molding powder comprising a phenol-formaldehyde molding resin, a wood flour and a fusible condensation product formed by the reaction of a formaldehyde with a pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

CORNELIS MATERS.